United States Patent [19]
Takei et al.

[11] Patent Number: 5,086,358
[45] Date of Patent: Feb. 4, 1992

[54] RECORDING AND REPRODUCING APPARATUS

[75] Inventors: Masahiro Takei, Kanagawa; Motokazu Kashida, Tokyo; Koji Takahashi, Kanagawa; Kenichi Nagasawa, Kanagawa; Toshiyuki Masui, Kanagawa; Tsutomu Fukatsu, Kanagawa, all of Japan

[73] Assignee: Canon Kabushiki Kaisha, Tokyo, Japan

[21] Appl. No.: 876,971

[22] Filed: Jun. 20, 1986

[30] Foreign Application Priority Data

Jun. 25, 1985 [JP] Japan .................. 60-136994

[51] Int. Cl.⁵ .................. G11B 15/04; G11B 15/48
[52] U.S. Cl. .................. 360/60; 360/74.4
[58] Field of Search .................. 360/31, 60, 62, 68, 360/66, 74.4

[56] References Cited

U.S. PATENT DOCUMENTS

| | | | |
|---|---|---|---|
| 3,588,375 | 6/1971 | Martin | 360/60 |
| 4,517,611 | 5/1985 | Kimura | 360/60 |
| 4,679,101 | 7/1987 | Tezuka | 360/60 |

Primary Examiner—Vincent P. Canney
Attorney, Agent, or Firm—Robin, Blecker & Daley

[57] ABSTRACT

An apparatus for recording and reproducing information signals on and from a recording medium is arranged to cancel out an instruction for recording an information signal if some information signal has already been recorded on the medium.

11 Claims, 6 Drawing Sheets

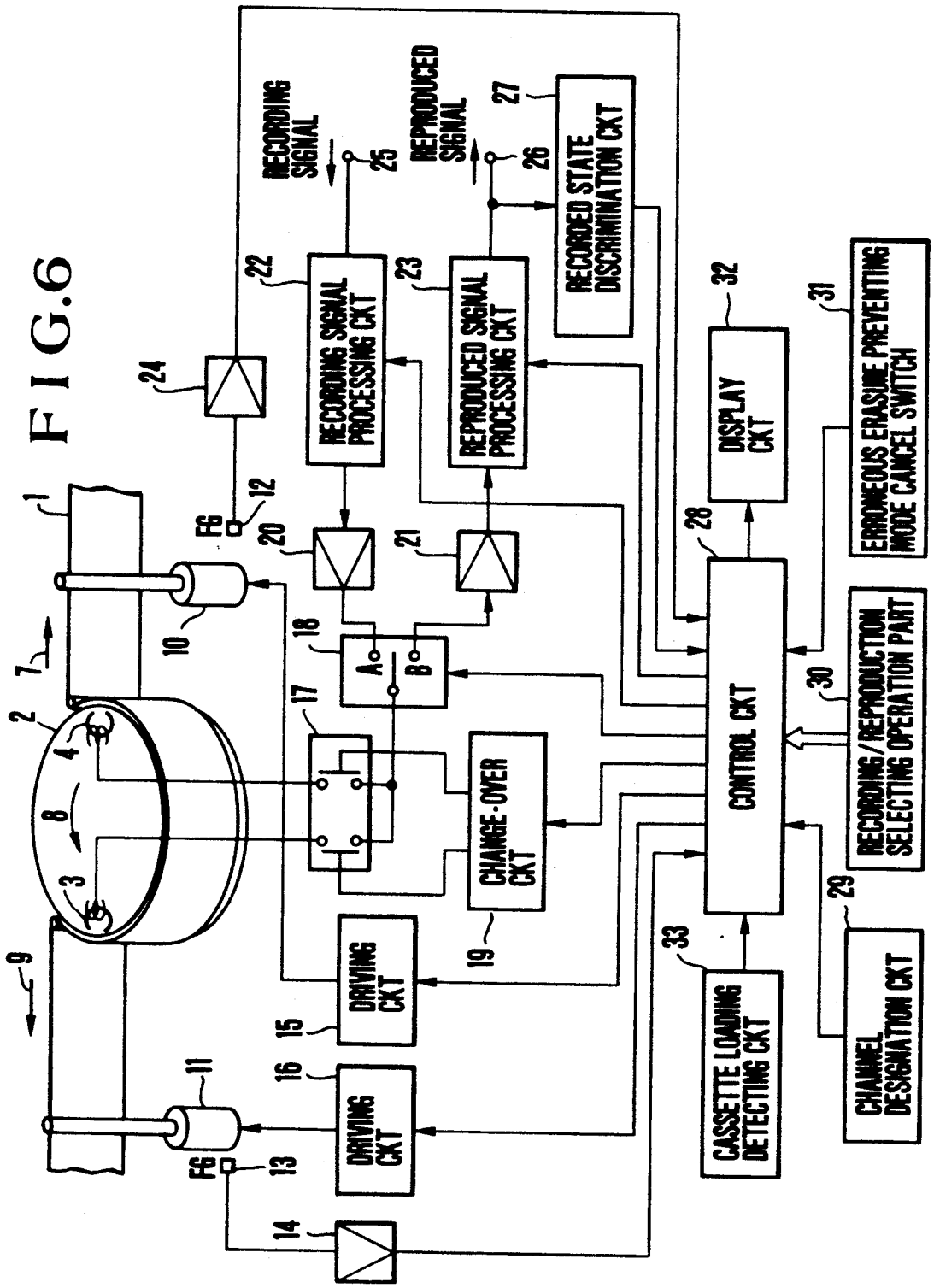

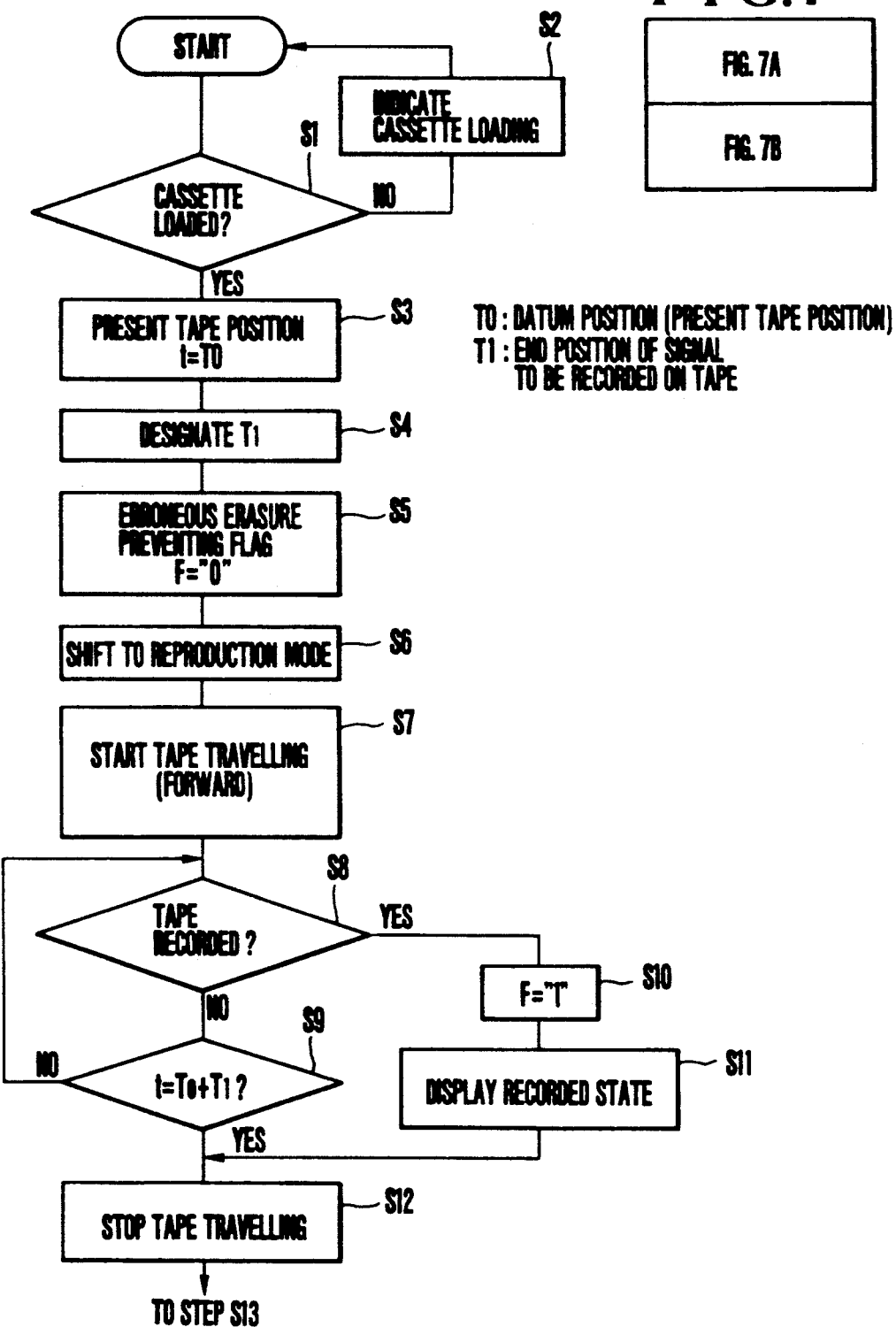

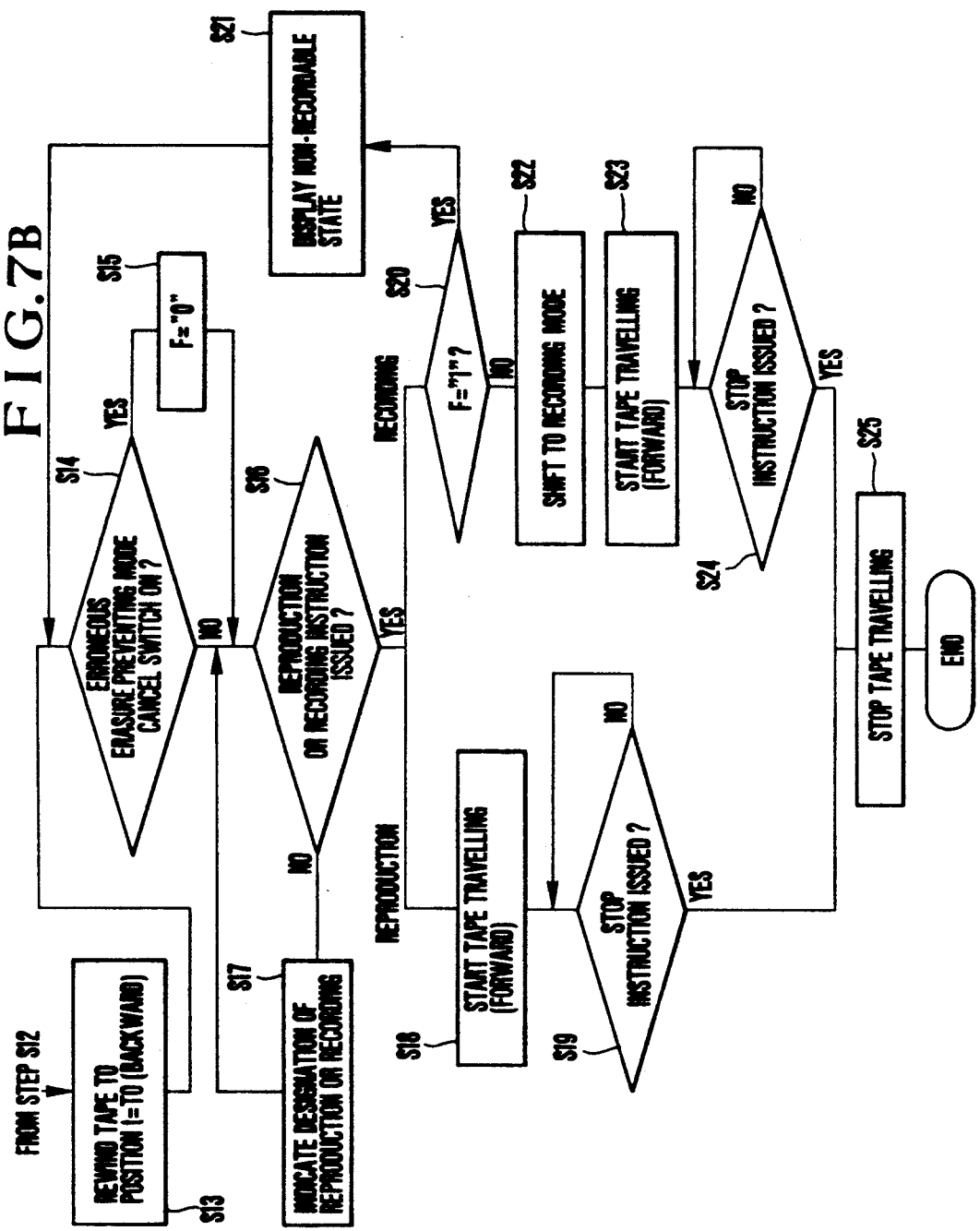

RECORDING AND REPRODUCING APPARATUS

BACKGROUND OF THE INVENTION

1. Field of the Invention

This invention relates to an apparatus for recording and reproducing information signals on and from a recording medium.

2. Description of the Related Art

In the field of magnetic recording, it has been a recent trend to pursue high density recording. Video tape recorders (hereinafter referred to as VTR's) also have come to increase the density of magnetic recording by lowering the travelling speed of the tape. As a result, however, it has become impossible to obtain reproduced sounds in high quality in accordance with the conventional method of recording audio signals by means of a fixed head because a required degree of relative speed is not obtainable between the head and the tape. In a conceivable method for solving this problem, the recording tracks to be formed by means of rotary heads are arranged to be longer to have audio signals recorded one after another in the extended areas of the tracks by time-base compressing the audio signals.

FIG. 1 of the accompanying drawings shows the tape transport system of the VTR of the above-stated prior art. FIG. 2 shows the recording locus formed on the magnetic tape by the same VTR. These illustrations include the magnetic tape 1; a rotary cylinder 2; heads 3 and 4 which are mounted on the rotary cylinder 2 with a phase difference of 180 degrees between them and have different azimuth angles from each other; a video recording area 5 within each of recording tracks formed on the tape 1; and an audio recording area 6 provided in each of the tracks. The video recording area 5 is formed with the tape traced by the heads 3 and 4 when the cylinder 2 rotates 180 degrees. The audio area 6 is formed by the heads 3 and 4 when the cylinder 2 rotates to a degree of angle θ.

An audio signal which is pulse-code modulated (PCM) and time-base compressed is recorded in the audio recording area. With the audio signal thus recorded, the signal can be reproduced at a high degree of sound quality which favorably compares with signals reproduced by an audio dedicated apparatus.

Meanwhile, there has been proposed a modification of the prior art VTR of the above-stated kind, wherein: Other audio signals are arranged to be recordable also in the video recording area 5. For example, assuming that the above-stated angle θ is 36 degrees, five audio recording areas which are similar to the above-stated audio recording area 5 can be obtained while the rotary cylinder rotates 180 degrees. Then, with the time-base compressed audio signals arranged to be recorded in each of these areas, an audio dedicated tape recorder which is capable of recording audio signals in a total of six channels can be obtained by this arrangement. FIG. 3 shows the tape transport system of that tape recorder. FIG. 4 shows the recording locus of the tape recorder formed on the tape. In FIGS. 3 and 4, the same reference numerals as those shown in FIGS. 1 and 2 indicate the same parts.

Referring to FIGS. 3 and 4, while the head 3 or 4 is tracing the tape 1 between points A and B; B and C; C and D; D and E; E and F; and F and G, audio signals are recorded in areas CH1 to CH6. Each of these audio signals is recordable in each of these areas independently of others. While the so-called azimuth overlapped writing is arranged to be accomplished, the recording tracks within each of these areas CH1 to CH6 do not have to be formed in perfect alignment. While pilot signals for tracking control are also recorded in each of these areas, they have no correlation with those of other areas.

The above-stated multi-channel audio tape recorder may be arranged to record and reproduce only in the forward direction of the tape (for example, in the direction of arrow 7 of FIG. 3) for all the channels. However, the operability of the tape recorder may be improved by arranging it to be recordable and reproducible not only in the forward direction but also in the reverse direction. In the case of such arrangement, the recording or reproduction is, for example, performed while the tape is travelling in the direction of arrow 7 for the areas CH1 to CH3 and in the direction of arrow 9 for the areas CH4 to CH6. Therefore, the inclination of the recording tracks formed in the areas CH1 to CH3 somewhat differs from that of the tracks formed in the areas CH4 to CH6. As regards to a difference in relative speed, however, a difference due to the travel of the tape in the opposite directions is much smaller than a difference due to the revolution of the heads 3 and 4 and thus presents no problem.

FIG. 5 is a time chart showing the recording or reproducing operation of the tape recorder which is arranged as described above. A phase detection pulse signal (hereinafter referred to as signal PG(a)) is produced in synchronism with the rotation of the rotary cylinder 2 as shown at a part (a) in FIG. 5. The signal PG(a) is in a rectangular wave form of 30 Hz alternately repeating high (H) and low (L) levels in a cycle of 1/60 sec. Another phase detection pulse signal (hereinafter referred to as signal PG(b)) is opposite in polarity to the signal PG(a) as shown at a part (b). The signal PG(a) is at a high level (H) while the head 3 turns from the point B to the point G as shown in FIG. 3. The signal PG(b) is at a high level (H) while the other head 4 turns from the point B to the point G.

A part (c) in FIG. 5 shows a data reading pulse signal which is obtained from the signal PG(a) and is used for sampling, for every other field, an audio signal of a period corresponding to one field portion (1/60 sec) of a video signal. A part (d) of FIG. 5 shows a signal representing signal processing periods during which the one-field portion of the audio data (or signal) sampled is subjected to signal processing operations such as addition of an error correcting redundant code or the like using a RAM or the like, rearrangement of the data, etc. These periods obtain when this signal is at a high level. A part (e) shows a signal which is at a high level to indicate a data recording period for recording on the tape 1 the recording data obtained through the above-stated signal processing operation.

For example, the temporal flow of the signals indicated in FIG. 5 is as follows: The data is sampled during a period between points of time t1 and t3 (during which the head 3 is moving from the point B to the point G). During a period between points of time between t3 to t5 (during which the head 3 is moving from the point G to the point A), the sampled data is signal processed. Recording is accomplished during a period between points of time t5 and t6 (while the head 3 is moving from the point A to the point B). In other words, the data is recorded by the head 3 in the area CH1 of FIG. 4.

Meanwhile, the data which is sampled when the signal PG(b) is at a high level is also signal processed at similar timing and is recorded by the other head 4 in the area CH1.

A part (f) in FIG. 5 shows a phase detection pulse signal (hereinafter referred to as signal PG(f)) representing a phase shifted to a given degree of phase which is 36 degrees in this instance. This signal PG(f) and another signal PG which is not shown but is opposite to the signal PG(f) in polarity are used in recording an audio signal. The audio signal recording is performed as follows: The data sampled during a period between the points of time t2 and t4 is signal processed during another period between the points of time t4 and t6 according to a signal (g) which is shown at a part (g) of FIG. 5 and is then recorded during a period between the points of time t6 and t7 according to a signal (h) which is shown at a part (h) in FIG. 5. In other words, the audio signal is recorded by the head 3 in the area CH2 shown in FIG. 4 while the head 3 is tracing the tape between points B and C. The data which is sampled during a period between the points of time t4 and t7 is likewise recorded by the other head 4 in the area CH2 shown in FIG. 4.

The signal recorded in the area CH2 is reproduced in the following manner:

The head 3 reads out data from the tape 1 according to the signal (h) shown in FIG. 5 during a period between the points of time t6 and t7 (or between t1 and t2). The data which is thus read out is subjected to a signal processing operation which is carried out according to a signal (i) shown in FIG. 5 during a period between the points of time t7 and t8 (or between t2 and t3) in a manner reverse to the signal processing operation performed for recording. In other words, during this period, error correction, etc. are carried out. Following this, during a period between points of time t8 and t9 (or between t3 and t6), a reproduced audio signal is produced in accordance with a signal (j) shown at a part (j) of FIG. 5. It goes without saying that the head 4 meanwhile also performs the reproducing operation at a phase difference of 180 degrees from the above-stated operation to give likewise a reproduced audio signal.

For each of other areas CH3 to CH6, the signal PG(a) is phase shifted by n×36 degrees as applicable. Recording or reproduction is then performed on the basis of the phase shifted signal PG(a) irrespective of the travelling direction of the tape.

With the recording and reproducing apparatus of the prior art thus arranged to perform the multi-channel operation, the recordable length of time on a single piece of cassette tape becomes much longer than before. While this is an advantage, it becomes difficult to grasp the recorded states of all the channels. For example, in the case of a single channel, only one erroneous erasure preventing pin is to be broken after completion of recording. Whereas, in the case of a multi-channel arrangement, an erroneous erasure preventing pin must be provided for every channel and must be broken after completion of recording in each of the channels. Therefore, the multi-channel arrangement necessitates use of a complex detecting device and a complex circuit.

In a conceivable method for solving this problem, an erroneous erasure preventing signal is arranged to be recorded on a tape together with information signals. This arrangement, however, necessitate some arrangement for recording and reproduction of the erroneous erasure preventing signal and a circuit for detecting it. Besides, in that event, no erroneous erasure preventing arrangement can be added later on. Further, in the case of an apparatus which is capable of performing recording over such a long period of time as mentioned in the foregoing, it is inconvenient to have many erroneous erasures preventing parts intermittently provided on the tape.

SUMMARY OF THE INVENTION

It is a general object of this invention to provide a recording and reproducing apparatus which solves all the above-stated problems of the prior art.

It is a more specific object of this invention to provide a recording and reproducing apparatus which is capable of effectively preventing erroneous erasures and excels in operability.

Under these objects, a recording and reproducing apparatus arranged as an embodiment of this invention comprises: recording means for recording an information signal on a recording medium; reproducing means operable for reproducing the information signal recorded on the recording medium; discriminating means for discriminating, on the basis of an output signal of the reproducing means, whether any information signal is recorded on the recording medium; instructing means for instructing the recording means to record the information signal; and canceling means for canceling an instruction of the instructing means on the basis of a discrimination result produced by the discriminating means prior to execution of the instruction of the instructing means.

It is another object of this invention to provide a recording and reproducing apparatus which is capable of detecting without fail whether a recording medium to be used for recording has been already recorded or not without any manual operation by the operator.

Under this object, a recording and reproducing apparatus arranged as another embodiment of this invention comprises: recording means for recording an information signal on a recording medium; reproducing means operable for reproducing the information signal recorded on the recording medium; detecting means for detecting that the recording medium is set in a predetermined position at which the information signal can be recorded by the recording means or a recorded signal can be reproduced by the reproducing means; and discriminating means for discriminating whether any information signal is recorded on the recording medium, the discriminating means being arranged to produce a discrimination result on the basis of an output signal of the reproducing means and in response to a detection signal produced by the detecting means indicating that the medium is in the predetermined position.

These and further objects and features of this invention will become apparent from the following detailed description of the disclosure made in the accompanying drawings.

BRIEF DESCRIPTION OF THE DRAWINGS

FIG. 6 is a diagram showing in outline the arrangement of a tape recorder embodying this invention.

FIG. 7, 7A and 7B is a flow chart showing the operation of a control circuit shown in FIG. 6.

DETAILED DESCRIPTION OF THE PREFERRED EMBODIMENT

Figure 1:
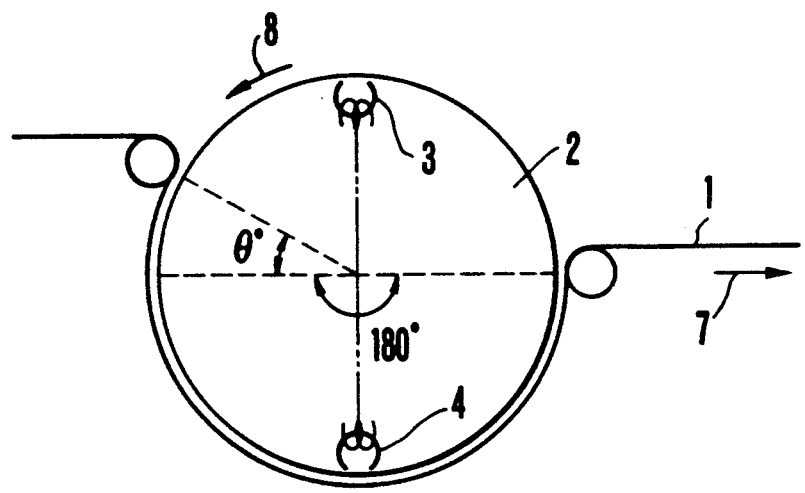
FIG. 1 is a schematic illustration of a tape transport system of the conventional VTR.
Figure 2:
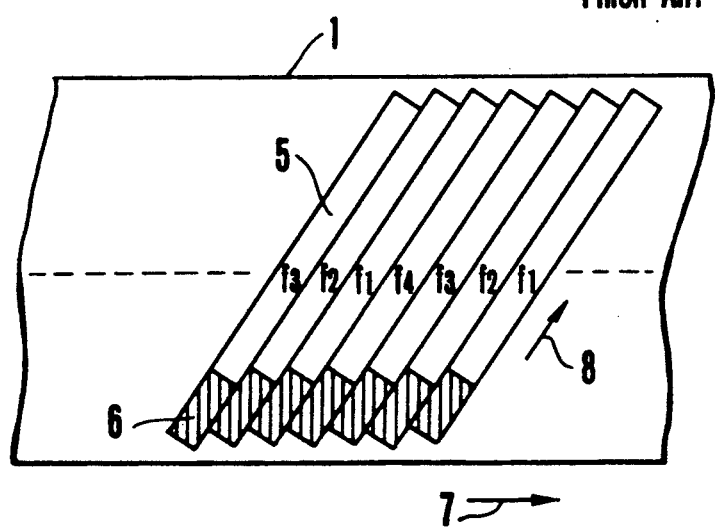
FIG. 2 is an illustration of a recording locus formed by the same VTR on a magnetic tape.
Figure 3:
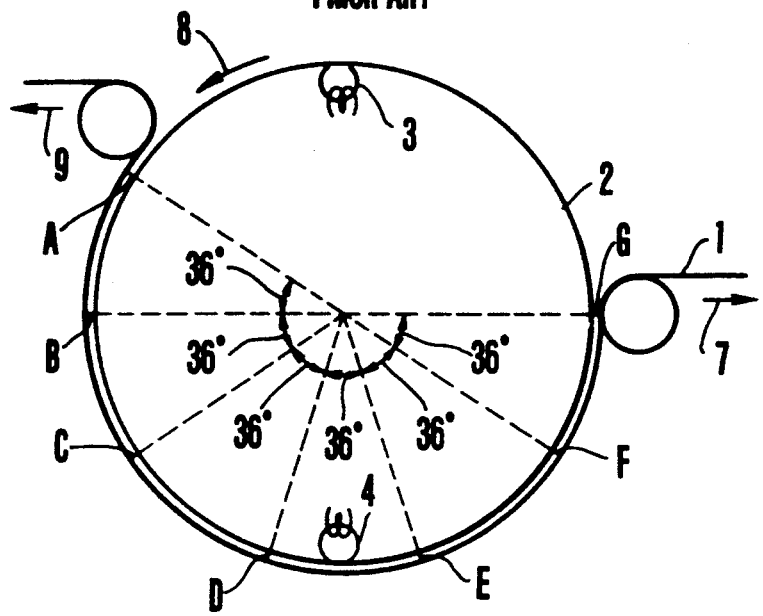
FIG. 3 is a schematic illustration of a tape transport system of another apparatus of the prior art.
Figure 4:
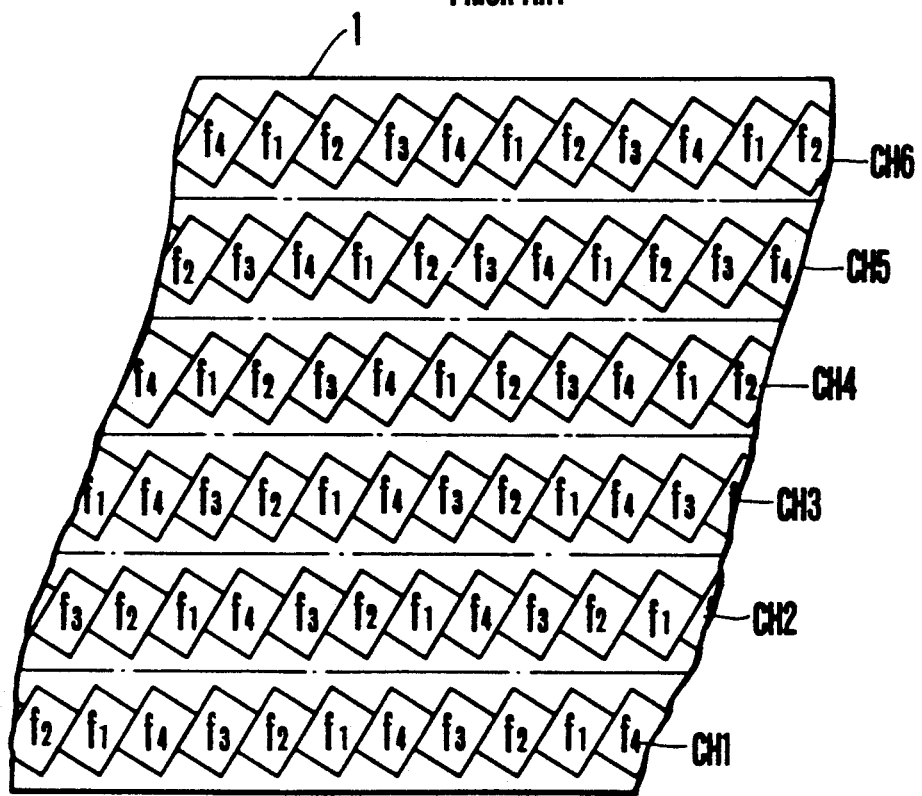
FIG. 4 is an illustration of areas in which audio signals are to be recorded by the apparatus of FIG. 3.

FIG. 6 shows in outline the whole arrangement of a recording and reproducing apparatus arranged as a preferred embodiment of this invention. The illustration includes capstans 10 and 11; pulse signal generators 12 and 13 each of which is arranged to generate a pulse signal (hereinafter referred to as a pulse signal FG) at a frequency corresponding to the rotation of the capstan; amplifiers 14 and 24; capstan driving circuits 15 and 16; switch circuits 17 and 18; a change-over circuit 19; amplifiers 20 and 21; a recording signal processing circuit 22; a reproduced signal processing circuit 23; input and output terminals 25 and 26; a recorded state discrimination circuit 27; a control circuit 28; a channel designation circuit 29; a recording/reproduction selecting operation part 30; an erroneous erasure preventing mode cancel switch 31; a display circuit 32 and a cassette loading detecting circuit 33. The recording and reproducing apparatus which is arranged in this manner is provided with recording/reproducing heads 3 and 4 which are arranged in the same manner as shown in FIG. 3. The tape 1 is arranged to be movable forward (in the direction of arrow 7) and backward (in the direction of arrow 9) by means of the capstans 10 and 11 respectively. These capstans are driven by the capstan driving circuits 15 and 16 which are under the control of the control circuit 28. The capstans 10 and 11 are respectively provided with FG pulse generators 12 and 13. The pulse signals FG produced from these generators 12 and 13 according to the rotation of these capstans are supplied to the control circuit 28. The control circuit 28 is provided with a counter which is arranged, for example, to up count the pulses coming from the FG pulse generator 12 representing the forward move of the tape and another counter which is arranged, for example, to down count the pulses coming from the other FG pulse generator 13 representing the backward move of the tape. The control circuit 28 is thus arranged to obtain data indicative of the position of the tape.

An audio signal to be recorded is supplied via the input terminal 25. The incoming signal is supplied to the recording signal processing circuit 22. The signal is digitized; has error correcting redundant data or the like added thereto; and is eventually digital modulated at the circuit 22. The signal which is thus processed is then supplied via the amplifier 20 to one terminal A of the switch circuit 18.

Figure 5:
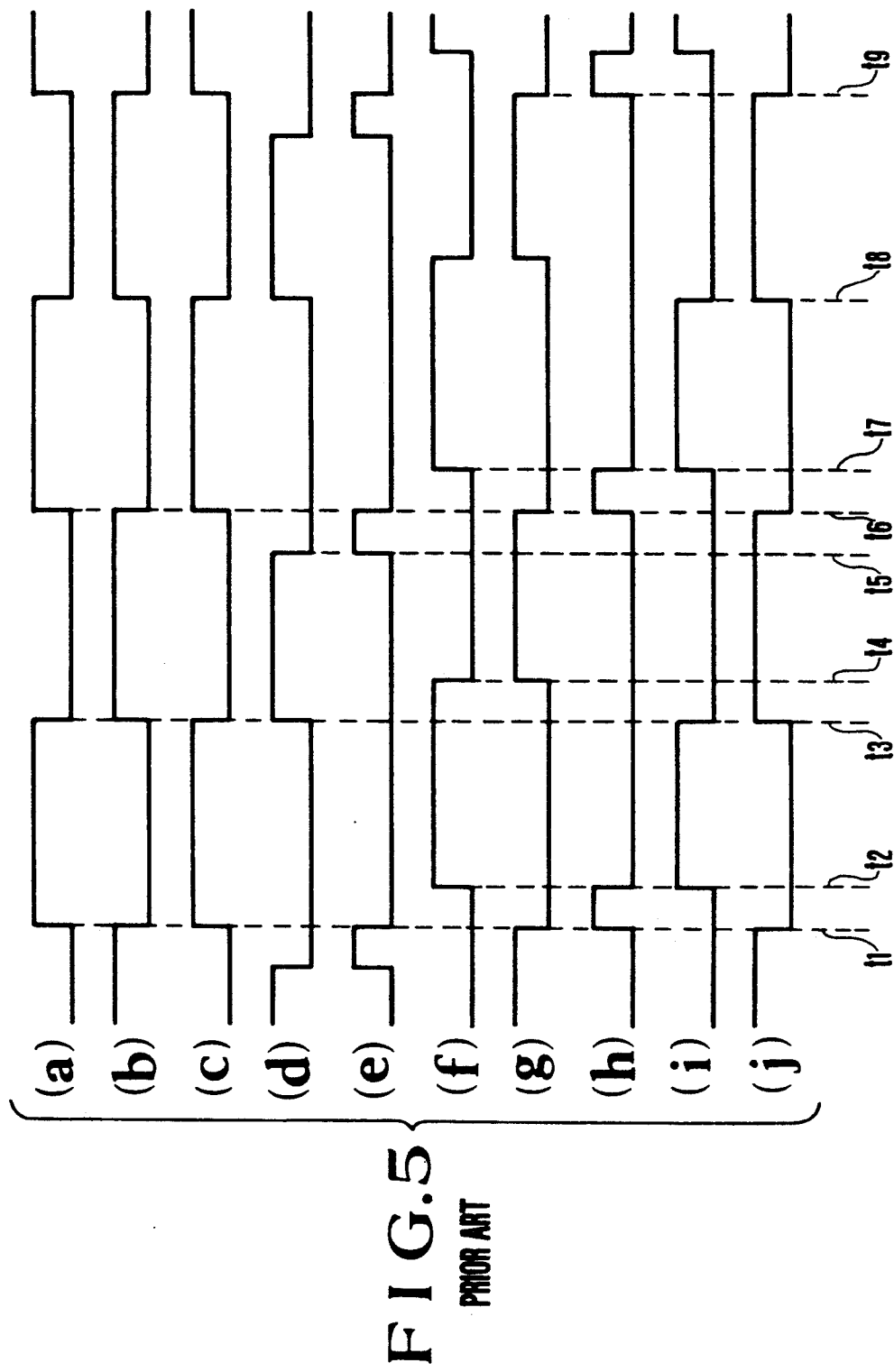
FIG. 5A through J is a time chart showing the recording and reproducing operation of the same apparatus in and from the recording areas shown in FIG. 4.

During a recording operation, the connecting position of the switch circuit 18 is on the side of the terminal A. Therefore, the recording signal is supplied to the recording/reproducing heads 3 and 4 via the switch circuit 17 which is under the control of the change-over circuit 19 at the same timing as described in the foregoing with reference to the chart of FIG. 5. Upon receipt of the signal, the heads 3 and 4 record the signal in a channel designated by the channel designation circuit 29. Then, recording tracks are formed in this designated channel.

During a reproducing operation, the signal recorded in a designated channel is likewise caused to be reproduced by the recording/reproducing heads 3 and 4 through the switch circuit 17. The reproduced signal is supplied to the switch circuit 18. In this instance, the connecting position of the switch circuit 18 is on the side of the other terminal B thereof. The reproduced signal or data is thus supplied via the amplifier 21 to the reproduced signal processing circuit 23. The circuit 23 then performs a signal processing operation in a manner reverse to the signal processing operation performed by the recording signal processing circuit 22. Digital demodulation, error correcting, digital-to-analog converting processes, etc. are thus carried out to obtain a reproduced analog audio signal. The reproduced analog audio signal is supplied to the output terminal 26 and the recorded state discrimination circuit 27. The discrimination circuit 27 then makes a discrimination between presence and absence of any recorded audio signal in the designated channel. This discrimination is made, for example, on the basis of the level of the reproduced signal obtained through an envelope detection process.

The control circuit 28 is arranged to receive the output of the discrimination circuit 27 representing the result of the above-stated discrimination; the output of the channel designation circuit 29 which is arranged to give information on a specific channel to be used for recording or reproducing a signal; and a recording or reproducing instruction issued from the recording/reproduction selecting operation part 30. Further, as will be further described later with reference to FIG. 7, in the event of an erroneous erasure preventing mode resulting from the output of the recorded state discrimination circuit 27, the control circuit 28 receives also the output of an erroneous erasure preventing mode cancel switch 31 which is provided for cancellation of the erroneous erasure preventing mode. The detection output of the cassette loading detecting circuit 33 is also supplied to the control circuit 28. The display circuit 32 is arranged to display a channel number in which a recording or reproducing operation is presently performed; information as to whether or not any signal has already been recorded in the channel; information as to whether or not the apparatus is in the erroneous erasure preventing mode; etc.

Referring now to the flow chart of FIG. 7, the operation sequence of the control circuit 28 is as follows: At a step S1: The apparatus is loaded with a tape cassette after a power supply is switched on. The cassette loading detecting circuit 33 detects this. At a step S3: Data which is indicative of the present tape position and obtained by means of a tape counter is stored at a memory. In this instance, tape position data t is indicated as data T0 indicative of the present tape position. At a step S2: If the apparatus is not loaded with a tape cassette, the operator is urged to load a tape cassette by means of the display device 32 or the like. At a step S4: Data T1 corresponding to the recording length of a signal to be recorded on the tape is designated. At a step S5: An erroneous erroneous erasion preventing flag F is set at "0". At a step S6: The operation shifts to a reproduction mode. The flag F is arranged to indicate that the operation is shiftable to a recording operation when the flag is in a state of F="0" and not shiftable to the recording operation when it is in a state of F="1". At a step S7: The tape begins to travel. In this instance, the tape travel direction is assumed to be in the forward direction when it is in the direction of arrow 7 of FIG. 6. At a step S8: Immediately after commencement of the tape travel, the recorded state discrimination circuit 27 of FIG. 6 detects whether any signal has already been recorded in the reproducing part of the tape. If it is found to be even partially recorded, the flag F is set at "1" at a step S10. At a step S11: This is indicated at the display circuit 32 of FIG. 6. At a step S12: The tape is stopped from travelling. At the step S8, if no existing record is found in the part, the operation proceeds to a next step S9. At the step S9: The discriminating action of the circuit 27 continues until the tape is moved to the end of the given length T1. At a step S13: After the tape travel comes to a stop, the tape is rewound back to its original position T0 by moving the tape backward or in the direction of arrow 9 of FIG. 3.

After completion of the above-stated steps, the display is checked to see the recorded state of the tape. Then, at a step S14: It is determined whether or not the erroneous erasion preventing mode cancel switch is to be turned on. At a step S16: The operator gives a reproducing or recording instruction according to the result of the determination made at the step S14. At a step S17: If no instruction is given, the designation of reproduction or recording is indicated.

In the case of reproduction, the value of the flag F makes no difference though the erroneous erasure preventing mode cancel switch might be operated one way or the other at the step S14 by the operator according to the display. At a step S18: When an instruction for reproduction is produced, the tape begins to travel forward (in the direction of arrow 7 of FIG. 3). At a step S19: The control circuit 28 waits for a next stopping instruction. At a step S25: If the stopping instruction is produced, the tape is brought to a stop.

Next, in the case of recording, the operator gives an instruction according to the recorded state detected. At a step S20: If the tape is found to have been already recorded and the apparatus is in the erroneous erasure preventing mode, the operator makes a decision as to whether the exsisting record is to be erased or not. The erroneous erasure preventing mode cancel switch is operated or not operated according to the decision. If the erroneous erasure preventing mode is cancelled at the step S14, the flag F is set at "0" at the step S15 to permit recording. Then, if a recording instruction is issued with no recorded state having been detected, the flag is checked. At the step S20: In the event of the state of the flag F="1", the operation proceeds to a step S21. At the step S21: A display is made to show a non-recordable state. Then, the control circuit again comes to wait for a next operation. If the flag is found in the state of F="0", the apparatus comes to perform a recording operation at a step S22. The tape begins to travel at a step S23. The recording operation continues until a stopping instruction is produced at a step S24. At a step S25: If the stopping instruction is produced, the travel of the tape is brought to a stop.

In the case of the specific embodiment described, after the power supply is switched on and before commencement of recording or reproduction with the apparatus loaded with a tape cassette, the tape is checked to see if it has already been recorded within a predetermined length (T=t0+T1) from the position t=T0. For this confirmation, the apparatus is set into a reproduction mode. The erroneous erasure preventing action is taken as necessary according to the result of this initial confirmation process. This arrangement to make an initial discrimination between a recorded state and non-recorded state, however, may be changed to be made at the end of every recording or reproducing operation. In that instance, the recording timing can be prevented from being delayed by the discriminating process.

Further, an arrangement to always make a discrimination between a recorded state and a non-recorded state by arranging a reproducing head to precede an erasing head effectively prevents any erroneous erasure of an existing record.

In accordance with the arrangement of the embodiment described, the recording and reproducing apparatus is arranged to automatically make a discrimination between presence and absence of an existing record prior to recording or reproduction irrespective of the intention of the operator. However, this arrangement may be changed to make such discrimination as desired by the operator.

What is claimed is:

1. A recording and reproducing apparatus, comprising:
   (a) recording means for recording an information signal on a tape-shaped recording medium;
   (b) reproducing means for reproducing signals recorded on said recording medium;
   (c) means for providing a signal indicative of a preselected length of the tape-shaped recording medium on which said information signal is to be recorded;
   (d) discriminating means for receipt of such signals reproduced by said reproducing means and such preselected length indicative signal for discriminating whether or not said information signal has been recorded on at least a part of a portion of said tape-shaped recording medium having a length corresponding to said preselected length and providing an output signal indicative of such discrimination; and
   (e) prohibiting means responsive to said discriminating means output signal for selectively prohibiting recording of said information signal by said recording means.

2. An apparatus according to claim 1, further comprising:
   manually operable means for providing an instruction signal to said recording means to record said information signal.

3. An apparatus according to claim 2, further comprising:
   display means for effecting a predetermined display in response to said instruction signal to record said information signal when said prohibiting means prohibits recording of said information signal.

4. An apparatus according to claim 1, wherein said prohibiting means includes memory means for storing said output signal of said discriminating means.

5. An apparatus according to claim 4, further comprising manually operable means for clearing stored contents in said memory means.

6. An apparatus according to claim 1, further comprising display means for effecting a predetermined display in response to indication in said output signal of said discriminating means that said information signal has been recorded on at least a part of the portion of said tape-shaped recording medium having a length corresponding to said preselected length.

7. An apparatus according to claim 1, further comprising conveying means for conveying said recording medium in its longitudinal direction, and wherein said discriminating means includes first detecting means for providing said discriminating means output signal while said conveying means is conveying said tape-shaped recording medium.

8. An apparatus according to claim 7, further comprising first control means for reversing the conveying direction of said conveying means to convey said tape-shaped recording medium responsively to said detecting means.

9. An apparatus according to claim 8, further comprising second detecting means for detecting a condition wherein said tape-shaped recording medium has reached a position occupied before commencement of operation of said first detecting means, after the conveying direction of said conveying means to convey said tape-shaped recording medium has been reversed by said first control means and second control means responsive to said second detecting means for discontinuing operation of said first control means in such conveyance of said tape-shaped recording medium.

10. A recording and reproducing apparatus, comprising:

(a) recording means for recording an information signal on a tape-shaped recording medium;

(b) reproducing means for reproducing signals recorded on said recording medium;

(c) conveying means for conveying said recording medium in its longitudinal direction;

(d) discriminating means for receiving signals reproduced by said reproducing means and for discriminating whether or not said information signal has been recorded on said tape-shaped recording medium and providing an output signal indicative of such discrimination; and (e) control means for receiving said discriminating means output signal and responsive to indication therein that said information signal has been recorded on said tape-shaped recording medium to reverse the conveying direction of said conveying means and to discontinue operation of said discriminating means.

11. An apparatus according to claim 10, further comprising detecting means for detecting a condition wherein said tape-shaped recording medium has reached a position occupied before commencement of operation of said discriminating means, after the conveying direction of said conveying means to convey said tape-shaped recording medium has been reversed by said control means, and conveyance stopping means responsive to said detecting means for stopping conveyance of the tape-shaped recording medium.

* * * * *